United States Patent [19]

van Kampen

[11] 4,016,041

[45] Apr. 5, 1977

[54] PROCESS OF MAKING GRANULAR ENZYMES OF REDUCED STICKINESS

[75] Inventor: Daniël Marten van Kampen, Vlaardingen, Netherlands

[73] Assignee: Lever Brothers Company, New York, N.Y.

[22] Filed: Jan. 22, 1976

[21] Appl. No.: 651,672

[30] Foreign Application Priority Data

Feb. 12, 1975 United Kingdom .............. 5978/75

[52] U.S. Cl. .................................. 195/68; 195/63; 252/DIG. 12; 252/383; 252/384
[51] Int. Cl.² ......................................... C07G 7/02
[58] Field of Search .............. 195/63, 68, DIG. 11; 252/DIG. 12, 383, 384

[56] References Cited

UNITED STATES PATENTS

| 2,589,330 | 3/1952 | Bradford et al. .................. 252/140 |
| 3,723,327 | 3/1973 | van Kampen et al. .......... 195/63 X |
| 3,775,331 | 11/1973 | Borrello ............................ 195/68 X |
| 3,868,336 | 2/1975 | Mazzola et al. ................... 252/527 |

FOREIGN PATENTS OR APPLICATIONS 1,361,387  7/1974  United Kingdom ................. 195/63

*Primary Examiner*—Lionel M. Shapiro
*Attorney, Agent, or Firm*—Lever Brothers Company

[57] ABSTRACT

Enzyme-marumes are rendered less sticky and better sievable by dusting them with MgO or MgO/MgCO$_3$ as dusting powder.

2 Claims, No Drawings

PROCESS OF MAKING GRANULAR ENZYMES OF REDUCED STICKINESS

The present invention relates to particular granular enzyme preparations. In particular the present invention relates to spheronized enzyme preparations with reduced stickiness and improved sievability, and a method for preparing them. Recently a special granular form of enzyme preparations has been introduced in the art, i.e. the form of marumes. These are solid granules containing enzymes homogeniously distributed therethrough, and are prepared by spheronizing an enzyme containing extrudate in an apparatus which comprises a cylinder with a smooth wall having positioned therein a roughened, horizontal rotatable table. The extrudate, which is obtained by extrusion of a suitable mixture of enzymes and organic and/or inorganic extrudable material, as the case may be in admixture with small amounts of binding or lubricating agents, for example noodles, is fed into this apparatus, and by the centrifugal forces exerted upon the noodles by the rotation of the table the noodles are transformed in spheronized granules, called marumes. The apparatus is known in the art under the registered trade name "Marumerizer", and is manufactured by Fuji Paudal KK, Japan. This apparatus is described in German Patent Speccification 1,294,351 and U.S. Pat. No. 3,277,520.

Marumes and their method of preparation have been described in British patent specification No. 1,361,387. According to this publication, a water-containing extrudate is spheronized to form solid small sphere-like bodies, marumes, in an apparatus as described above. These marumes can then further be coated with a suitable coating material, e.g. nonionic surface-active agents such as polyethyleneglycols, condensation products of ethylene oxide with alkyl phenols, fatty alcohols and the like compounds.

During the spheronizing a dusting powder, such as anhydrous sodium sulphate or titanium dioxide can be used, to prevent caking of the marumes. The marumes are subsequently usually sieved, to remove possibly present small particles. While e.g. anhydrous sodium sulphate may indeed provide free-flowing, non-sticky marumes, the sievability of the thus treated marumes is unsatisfactory.

It has now been found that if the marumes are treated during spheronization with magnesium oxide, either alone or in admixture with magnesium carbonate as dusting powder, non-sticky, free-flowing marumes are obtained which are very well sievable. Whereas a great number of well-known dusting powders gave marumes which were either sticky after dusting or which yielded lumps after sieving, or both, MgO or MgO/MgCO$_3$ mixtures as dusting powder yielded marumes which were free-flowing and non-sticky after dusting, and which did not form lumps after sieving.

The present invention therefore provides a process for preparing enzyme-marumes with a significantly reduced stickiness and a significantly improved sievability, comprising forming an extrudate of a mixture of enzymes and an organic and/or inorganic extrudable material, and spheronizing the extrudate in a manner known per se, while adding a dusting powder during the spheronizing operation, in which MgO or a MgO/MgCO$_3$ mixture as dusting powder. The MgO or MgO/MgCO$_3$ mixture used in the present invention has a particle size predominantly ranging from 40 to 250 $\mu$. Technical MgO often contains a minor proportion of MgCO$_3$ (in a ratio of 10:1) and is equally applicable in the present invention.

In general, the amount of dusting powder necessary ranges from 0.1–5%, usually from 1–3%, based on the weight of the marumes to be treated.

Although the present invention is applicable to marumes, prepared from water-containing extrudates, it is also applicable to water-free extrudates. In the latter case a final drying step, usually necessary in the former case, is normally not necessary.

The marumes obtained according to the present invention are particularly suitable for incorporation in detergent compositions to formulate particulate enzymatic detergent compositions therewith. The marumes contain proteolytic and/or amylolytic enzymes, preferably bacterial proteases and/or amylases, prepared by submersed fermentation of strains of B. Subtilis.

Although the present invention is in particular applicable to enzyme-marumes, it is in principle also applicable to marumes containing other detergent adjuncts, such as low-temperature bleach precursors, germicides or bactericides, fluorescers, anti-soil redeposition agents and colouring agents.

The invention will now be further illustrated by way of example.

EXAMPLE

Enzyme marumes were prepared by mixing 63% NaCl, 18% sec. C$_{11}$–C$_{15}$ linear alcohol condensed with 9 moles of ethylene oxide, 4% citric acid and 15% of an enzyme concentrate (a proteolytic bacterial enzyme Alcalase ex Novo Industri AS) in a mixer, extruding this mixture through a convenient extruder to form noodles, and spheronizing these noodles in a Marumerizer. During the spheronizing operation, which took place for 2 minutes, 1% by weight of one of the dusting powders tabulated hereunder was added in each experiment.

The flow characteristics of the thus treated marumes were visually assessed after the dusting treatment (by visually assessing the caking and flowing characteristics of a sample in a glass tube); the sievability was assessed by sieving the thus treated marumes. The results of these tests are tabulated hereunder. The MgO/MgCO$_3$ had the following particle size distribution:

89.8% < 250 $\mu$
8.9% > 250 $\mu$
1.3% > 1000 $\mu$

| Dusting powder | Flow characteristic after dusting | Sievability |
| --- | --- | --- |
| Highly voluminous silica (Aerosil) | very sticky | big lumps on 12 mesh |
| Highly voluminous silica (Gasil) | very sticky | big lumps on 12 mesh |
| Highly voluminous alumina Alusil) | sticky | big lumps on 12 mesh |
| Carboxy methyl cellulose | free flowing | lumps on sieves; 44 mesh blinded |
| Sodium sulphate | free flowing | lumps on 44 mesh; blinded |
| Sodium chloride | free flowing | lumps on 44 mesh; blinded |
| Sodium tripoly-phosphate | free flowing | lumps on 44 mesh; blinded |
| Calcium phosphate | free flowing | lumps on 44 mesh; blinded |
| Calcium carbonate | free flowing | lumps on 44 |

-continued

| Dusting powder | Flow characteristic after dusting | Sievability |
| --- | --- | --- |
| Calcium sulphate | free flowing | mesh; blinded lumps on 44 mesh; blinded |
| Titanium dioxide | very sticky | big lumps on 12 mesh |
| Titanium dioxide/ Mg-silicate (4:1) | very sticky | big lumps on 12 mesh |
| Magnesium silicate | very sticky | big lumps on 12 mesh |
| Talcum powder | slightly sticky | lumps on 44 mesh; blinded |
| Control (no dusting powder added) | slightly sticky | lumps on 44 mesh; blinded |
| Magnesium oxide | free flowing | very well sievable, no lumps, no blinding |
| Magnesium oxide/ magnesium carbonate (10:1) | free flowing | very well sievable, no lumps, no blinding |

These results show that the present invention provides free-flowing, very well sievable marumes. In addition, these marumes were found to be attrition-stable, producing only a very low amount of dust on handling.

What is claimed is:

1. In a process for the preparation of enzyme-marumes with a reduced stickiness and an improved sievability, comprising forming an extrudate of a mixture of proteolytic or amylolytic enzymes and an organic or inorganic extrudable material, spheronizing the extrudate to form marumes while adding a dusting powder during the spheronizing operation, the improvement comprising adding magnesium oxide or a mixture of magnesium oxide with magnesium carbonate in a weight ratio of 10:1 as dusting powder, said powder having an average particle size ranging from 40 to 250 microns, in an amount of 0.1–5% by weight of the marumes.

2. The process of claim 1, wherein the dusting powder is used in an amount of 1–3% by weight of the marumes.

* * * * *